United States Patent
Couch et al.

(10) Patent No.: US 10,309,615 B2
(45) Date of Patent: Jun. 4, 2019

(54) LIGHT EMISSIVE DISPLAY BASED ON LIGHTWAVE COUPLING IN COMBINATION WITH VISIBLE LIGHT ILLUMINATED CONTENT

(71) Applicant: Sun Chemical Corporation, Parsippany, NJ (US)

(72) Inventors: Erick Christopher Couch, Santa Barbara, CA (US); Andrew Michael Bakaysza, Palos Verdes Estates, CA (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 15/015,436

(22) Filed: Feb. 4, 2016

(65) Prior Publication Data

US 2016/0231491 A1     Aug. 11, 2016

Related U.S. Application Data (60) Provisional application No. 62/113,650, filed on Feb. 9, 2015.

(51) Int. Cl.
*F21V 8/00*     (2006.01)
*F21V 9/08*     (2018.01)
*F21V 23/04*    (2006.01)

(52) U.S. Cl.
CPC ............ *F21V 9/08* (2013.01); *F21V 23/0471* (2013.01); *G02B 6/005* (2013.01); *G02B 6/006* (2013.01); *G02B 6/0076* (2013.01)

(58) Field of Classification Search
USPC .............................. 362/606; 345/1.3, 76, 671
See application file for complete search history.

(56) References Cited

U.S. PATENT DOCUMENTS 2,560,117 A   7/1951   Mallary
4,147,932 A   4/1979   Lewis
(Continued)

FOREIGN PATENT DOCUMENTS

EP     0 272 760      6/1988
EP     1 158 332     11/2001
(Continued)

OTHER PUBLICATIONS

International Search Report and Written Opiniono F the Internatl Searching Authority in corresponding PCT appln PCT/US2016/016725, dated Jun. 6, 2016, 13 pages.
(Continued)

*Primary Examiner* — Allyson Trail
(74) *Attorney, Agent, or Firm* — Charles C. Achkar; Ostrolenk Faber LLP.

(57) ABSTRACT

A display with a first emissive image and a second image. The display includes a waveguide that includes an image formed from photoluminescent dyes on a surface of the waveguide which is activated by a first light source. A second light source behind said waveguide produces a second image. A light filter is positioned between the waveguide and the second light source. The second light source can illuminate a transparency, such as a translight, or a physical object providing an image that is viewable from the display when the second light source is illuminated and the first light source is not illuminated. The first image is viewable when the first light source associated with the waveguide is activated, emitting, for example, an ultraviolet light that activates the photoluminescent dyes, causing the first image to be viewable. The light filter behind the waveguide enhances the quality of the emissive image and prevents the image on the transparency or the physical (Continued)

object from being seen when the second light source is not illuminated.

30 Claims, 5 Drawing Sheets

(56) References Cited

U.S. PATENT DOCUMENTS

| | | | |
|---|---|---|---|
| 4,703,572 | A | 11/1987 | Chapin |
| 4,822,145 | A | 4/1989 | Staelin |
| 4,909,611 | A | 3/1990 | Spooner |
| 5,146,355 | A | 9/1992 | Prince et al. |
| 5,294,870 | A | 3/1994 | Tang et al. |
| 5,771,321 | A | 6/1998 | Stern |
| 5,898,185 | A | 4/1999 | Bojarczuk, Jr. et al. |
| 5,986,796 | A | 11/1999 | Miles |
| 5,994,722 | A | 11/1999 | Averbeck et al. |
| 6,208,791 | B1 | 3/2001 | Bischel et al. |
| 6,288,829 | B1 | 9/2001 | Kimura |
| 6,407,851 | B1 | 6/2002 | Islam et al. |
| 6,470,115 | B1 | 10/2002 | Yonekubo |
| 6,574,033 | B1 | 6/2003 | Chui et al. |
| 6,589,625 | B1 | 7/2003 | Kothari et al. |
| 6,635,306 | B2 | 10/2003 | Steckl et al. |
| 6,642,913 | B1 | 11/2003 | Kimura et al. |
| 6,819,845 | B2 | 11/2004 | Lee et al. |
| 6,961,167 | B2 | 11/2005 | Prins et al. |
| 6,967,763 | B2 | 11/2005 | Fujii et al. |
| 7,123,796 | B2 | 10/2006 | Steckl et al. |
| 7,430,355 | B2 | 9/2008 | Heikenfeld et al. |
| 2002/0120916 | A1 | 8/2002 | Snider, Jr. |
| 2004/0239580 | A1* | 12/2004 | Nagatani ............ G02B 6/0076 345/1.3 |
| 2006/0114197 | A1* | 6/2006 | Sibbett .................... G09F 21/02 345/76 |
| 2007/0053208 | A1 | 3/2007 | Justel et al. |
| 2009/0128895 | A1* | 5/2009 | Seo .......................... G02B 5/208 359/360 |
| 2009/0130430 | A1* | 5/2009 | Hugo ...................... C04B 28/02 428/325 |
| 2010/0142183 | A1 | 6/2010 | Lerenius |
| 2010/0259485 | A1 | 10/2010 | Chuang |
| 2011/0180826 | A1* | 7/2011 | Morito ...................... B41F 3/20 257/89 |
| 2013/0033476 | A1* | 2/2013 | Dean ...................... G09G 3/344 345/211 |
| 2013/0055602 | A1* | 3/2013 | Wright, Jr. ............... G09F 9/301 40/544 |
| 2013/0250207 | A1* | 9/2013 | Bohn ........................ G02B 6/00 349/61 |
| 2014/0367620 | A1* | 12/2014 | Gogle ...................... H05K 3/22 252/514 |
| 2016/0189579 | A1* | 6/2016 | Sun ...................... G02B 27/017 345/671 |

FOREIGN PATENT DOCUMENTS

| | | |
|---|---|---|
| EP | 1 220 190 | 7/2002 |
| EP | 1 271 457 | 1/2003 |
| GB | 2 404 448 | 2/2005 |
| JP | 2000-214804 | 8/2000 |
| WO | WO 97/31288 | 8/1997 |
| WO | WO 98/19201 | 5/1998 |
| WO | WO 98/54930 | 12/1998 |
| WO | WO 03/071347 | 8/2003 |
| WO | 2010/147923 A2 | 12/2010 |

OTHER PUBLICATIONS

European Search Report dated Feb. 6, 2007 issued in European Application No. 04817975.8.
R. Hayes et al., "Video-speed electronic paper based on electrowetting," *Nature*, 425:383-385, Sep. 25, 2003.
J.L. Jackel et al., "Electrowetting Optical Switch," *Appl. Phys. Lett.*, 40(1), Jan. 1, 1982.
X. Ma et al., "Optical Switching Technology Comparison: Optical MEMS vs. Other Technologies," *IEEE Optical Communications*, pp. S16-S23, Nov. 2003.
M.G. Pollack et al., "Electrowetting-based actuation of droplets for integrated microfuidics," *Lap Chip Journal*, 2:96-101, 2002.

* cited by examiner

LIGHT EMISSIVE DISPLAY BASED ON LIGHTWAVE COUPLING IN COMBINATION WITH VISIBLE LIGHT ILLUMINATED CONTENT

RELATED APPLICATION

The present application claims priority to U.S. Ser. No. 62/113,650 filed Feb. 9, 2015, the disclosure of which is hereby incorporated herein by reference in its entirety.

FIELD OF THE INVENTION

The invention relates to light emissive displays and, more specifically, to light emissive display devices based upon lightwave coupling in combination with subject matter illuminated with visible light.

BACKGROUND OF THE INVENTION

Photoluminescent printed waveguides can be produced using various photoluminescent colorants which are transparent when non-energized, yet emit color when subjected to ultra-violet, violet, or blue light energy. By printing on clear waveguides, multiple waveguide layers can be stacked and alternately energized to produce engaging motion effects. This technology has the benefit over competing technologies such as LCD in that it is a low cost printed approach which can be produced in sizes and shapes other than the standard ratio rectangular LCD products. Unlike LCDs, it can also be contour cut or 3D formed.

With emissive phosphors, it is impossible to create darkness. Primary RGB colors combine to form white. Therefore, provision of a dark background for image contrast is needed. This background can be provided by a dark ambient background such as in a dimly lit room, or by placing a dark surface behind the photoluminescent printed panels.

Photoluminescent inks often fade due to excitation such that useful life is greatly limited. Inclusion of motion, light or sound sensors to activate the display only when customers are present is one way to extend life, yet this approach has the drawback of being non-activated when customers are not in immediate proximity. Many display owners desire display systems which have at least 1 layer visible during non-sensor activated periods so that their customers who may be beyond the sensor activation range can still be presented with effective content.

Additionally, some photoluminescent colorants are not perfectly transparent. In ambient light, even when not intentionally subjected to ultra-violet, violet, or blue excitation light, these colorants can still exhibit noticeable color. When an image, text, or a graphic element is placed behind such a semi-transparent photoluminescent printed layer(s), a slight discoloration is imparted on the posterior layer.

In photoluminescent printed waveguides, excitation light is consumed by the presence of phosphors. As the quantity of phosphors increases, so does the requirement for excitation energy. It can be said that a waveguide absent of any photoluminescent phosphors requires no excitation energy and will emit no light. The opposite can also be stated. Complete coverage of a waveguide with RGB photoluminescent phosphors requires the most energy and, if balanced, produces white light. In practice, producing a largely white emissive display consumes much more energy than a dark one. Furthermore, light consumption across a waveguide decays so that available energy from the light injection point drops off sharply moving into the waveguide. This places practical limits the amount of photoluminescent ink which can be excited, and hence restricts the kind of artwork which can be used. It also is the primary limiting factor restricting the size of such waveguide displays.

Emissive RGB printed waveguides dependent on total internal reflection which convert incident energy of one wavelength to emissive color, consume available excitation energy according to the quantity and location of printed RGB phosphors. As the quantity of phosphors increase, the required excitation light must also increase. Therefore in general, dark background artwork is preferred over white background artwork. However many customer's require imagery, text or graphic elements containing a large quantity of light colored features such as graphics against a white background or imagery of snow filled mountains or images of white colored or near white colored products.

SUMMARY OF THE INVENTION

According to the present invention, a light emitting display includes a waveguide adapted to propagate light and having a photoluminescent feature formed on its surface using photoluminescent inks. A first light source is associated with the waveguide so that as it transmits light through the waveguide, it causes the photoluminescent inks to emit visible light. Behind the waveguide is a light filter and behind the light filter is a second light source which, when illuminated, shows a second feature or image.

In accordance with one embodiment of this invention, a display system is comprised of one or more photoluminescent printed waveguides, an edge or back lit transparency in the posterior position, and a light filter placed in between the transparency layer and the adjacent photoluminescent layer. The transparency layer provides a display element which can be illuminated for a very long time without significant color loss. The transparency layer can contain up to 100% white content. Sufficient transparency illumination is dependent on edge or back lighting, of which there are many commercially available solutions. The light filter reduces the visibility of the transparency layer such that it provides a sufficiently dark background for the photoluminescent layers when the transparency is in the non-illuminated state.

The light filter can be a flexible film or rigid in nature. If color accuracy of the transparency is required it may be a neutral density filter such that the light is reduced, but the colors are preserved.

In accordance with an embodiment of this invention, when an image, text, or a graphic element is printed on a waveguide using photoluminescent inks which are not fully transparent in ambient light even when non-energized, and when a second image, whether photoluminescent or transparency, is placed behind a semi-transparent photoluminescent printed layer(s), the slight discoloration which is imparted on the posterior layer(s) when viewed through the anterior layer may be corrected by modifying the colors in the posterior image. For photoluminescent posterior layers, this is accomplished by increasing the constituent colors in the content of the posterior layer For photoluminescent posterior layers, the approach of increasing phosphors to compensate for discoloration also increases luminance which compensates for light loss experienced by the viewer when viewing a posterior panel through the semi-transparent anterior layers. For a transparency posterior layer, this is accomplished by adjusting the visible ink content. Similarly, if more than one stacked anterior photoluminescent printed waveguides causes discoloration on a posterior photoluminescent waveguide or transparency, the posterior image color content can be adjusted such that when viewed through the anterior printed waveguides, the element is color corrected.

In accordance with an embodiment of this invention, a display system is comprised of one or more photoluminescent printed waveguides which are illuminated by a their associated light sources, and a physical object posterior to the photoluminescent layer(s), and a light filter placed in between the physical object(s) and the adjacent photoluminescent layer. The physical object(s) provides an aesthetic element which can be illuminated by a second light source for a very long time without color loss. The light filter reduces the visibility of the physical object(s) such that it provides a sufficiently dark background for the photoluminescent layers when the physical object(s) is in the non-illuminated state. The object(s) may be in an enclosure, a cooler or freezer or unenclosed.

In accordance with an embodiment of this invention, a display system is comprised of one or more photoluminescent printed waveguides which are illuminated by a their associated light sources, and one or more continuously illuminated physical objects posterior to the photoluminescent layer(s), and a light filter placed in between the physical object(s) and the adjacent photoluminescent layer. The light filter reduces the visibility of the physical object(s) such that it provides a sufficiently dark background for the photoluminescent layers when the physical object(s) is in the continuously illuminated state. Additional visible light can be directed onto the physical object(s) temporarily when the photoluminescent waveguide(s) are non-energized to increase the illumination of the physical object(s) above the level provided by the aforementioned continuous illumination to offset the light loss due to the light filter and make the object visible through the display. The object(s) may be in an enclosure, a cooler or freezer or unenclosed.

In accordance with an embodiment of this invention, a display system is comprised of one or more photoluminescent printed waveguides which are illuminated by a their associated light sources, and one or more continuously illuminated physical objects posterior to the photoluminescent layer(s), and a light filter placed in between the physical object(s) and the adjacent photoluminescent layer. The light filter reduces the visibility of the physical object(s) such that it provides a sufficiently dark background for the photoluminescent layers when the physical object(s) is in the non-illuminated state. The object(s) may be in an enclosure, a cooler or freezer or unenclosed.

DETAILED DESCRIPTION OF THE INVENTION

Figure 1A:
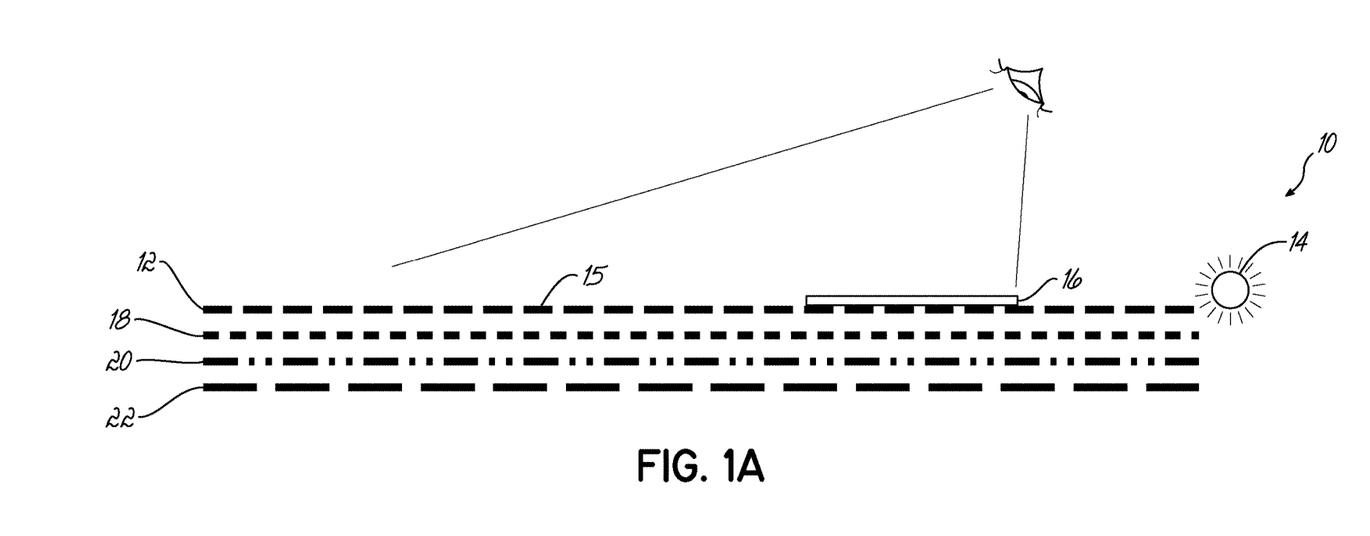
FIG. 1A is a diagrammatic cross-sectional view of a planar display according to the present invention.
Figure 2A:
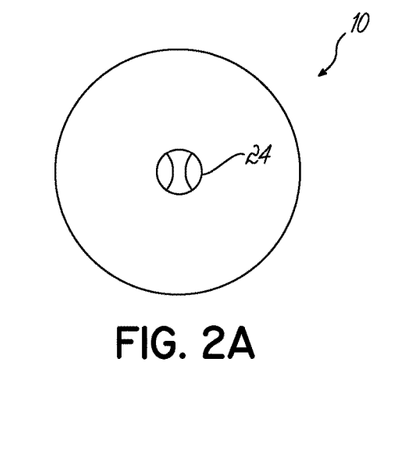
FIG. 2A is a plan view of the front surface of the display shown in FIG. 1A, showing a backlit image.

As shown in FIG. 1A, the present invention is a display 10 which incorporates a waveguide 12, having an edge-mounted light source 14. An image 16 is optically coupled to waveguide 12 using photoluminescent coloring agents as described hereinafter. Behind the waveguide 12 is a light filter 18. Behind light filter 18 is a transparency or translight which includes a second image 24 as shown in FIG. 2A. The transparency 20 includes a light source 22. As shown, this is backlit light source, however, it can be a variety of different light sources as explained hereinafter.

Waveguide 12 is any optically transparent material capable of propagating ultra-violet, violet, or blue light (wavelength less than 450 nm) and having a refractive index higher than the refractive index of an environment surrounding the display 10. A surrounding environment of gas or vacuum has a refractive index of about 1.0 and a surrounding environment of a low index liquid, such as water or other optical fluids, typically have refractive indices of about 1.3 to about 1.4. Suitable materials for constructing waveguide 12 include, but are not limited to, silicon nitride ($Si_3N_4$), silicon oxynitride (SiON), borosilicate glass, aluminosilicate glass, float glass, and other optical glasses and polymers known by those skilled in the art of optics. Particularly suitable materials for waveguide 12 include organic polymethyl methacrylate (PMMA) and inorganic silicon dioxide (glass), each of which has a refractive index of about 1.5 at visible light wavelengths. A more detailed description of the waveguide is disclosed in U.S. Pat. Nos. 7,123,796 and 7,430,355, the disclosures of which are hereby incorporated by reference.

The image 16 is formed from a photoluminescent layer, which is basically invisible under natural lighting conditions but, when exposed to ultraviolet light or bluelight, fluoresces, forming image 16. The image 16 is formed from photoluminescent materials printed or coated onto either the front or back surface 15 of waveguide 12. As shown, image 16 is on the front surface 15. If desired, the image can be on the back surface of waveguide 12 or image 16 can be formed on both the front and back surfaces.

Suitable short wavelength light sources 14 which generally emit light at a wavelength of 450 nm or less (generally 380-420 nm) include InGaN light emitting diodes, cold-cathode-lamps, or cold-cathode fluorescent lamps. Other ultra-violet, violet, blue, or even green or red light sources are possible and are chosen from light sources known by those skilled in the art of lighting and illumination.

Most incoherent light sources 14 emit light isotropically and require assistance in coupling light into the waveguide 12. For example, a parabolic or elliptical mirror (not shown) may be used to efficiently inject the light from these non-coherent light sources into the waveguide 12. A parabolic mirror decreases the angle incidence for light injection into the waveguide 12 and therefore also decreases Fresnel back-reflection of light at the adjacent surface of the waveguide 12. This decrease in back reflection is due to the theoretical decrease in Fresnel refection with decreasing angle of incidence. Optical lenses (not shown) may be used to improve the efficiency of light injection from the light source 14 into the waveguide. Some optical sources such as InGaN light emitting diodes are readily available in forward and side emitting lensed packages, which are well suited for injecting light into the waveguide 12.

Image 16 is formed from photoluminescent materials. When not illuminated, the image 16 is at least partially transparent. This can be accomplished by using photoluminescent materials which are partially transparent (preferably at least 50% transparent). Printing techniques can also be employed to improve the transparency of image 16. For example, if the dye used to form image 16 is sufficiently emissive the image 16 can be formed from microdots which are less noticeable when not activated. Luminescent inks may be selected for forming the photoluminescent features 16 that are very close to either the European Broadcasting Union (EBU) color gamut or the National Television System Committee (NTSC) color gamut, which permits images to be displayed that are equivalent to existing full color (television) monitors. The EBU white point of D65, for example, which corresponds to approximately 6504 Kelvin, may be attained by an appropriate selection of images corresponding, for example, to a minimum Maxwell triangle defined by the points (0.3, 0.4), (0.4, 0.3) and (0.3, 0.3) as depicted on a 1931 CIE Chromaticity diagram. The photoluminescent feature 16 will emit light at generally 420-650 nm.

Suitable materials for forming the photoluminescent image 16 include perylene, coumarin, and other commons fluorescent dyes, such as laser dyes, dispersed in a polymer host. Among the suitable materials are BASF Lumogen™ dyes dispersed in a polymethylmethacrylate (PMMA) matrix. Example dyes for red, green, and blue emission are Lumogen™ 300, Lumogen™ 083, and Lumogen™ 570, respectively. Suitable materials also include BASF Lumogen™ dyes in a high refractive index (n greater than about 1.5) polymer such as Brewer Science OptiNDEX A07. Suitable materials also include perylene, coumarin, or other commons laser dyes, doped into a polyvinylchloride (PVC) or polyvinyl butryal (PVB) matrix. Suitable materials also include dye or phosphor powder-doped materials such as DuPont TEFLON® AF fluoropolymer that has a refractive index of about 1.3.

Light filter 18 may be a film, such as those typically used for photographic purposes. The filter may be a neutral density filter or ND filter which reduces or modifies the intensity of all wavelengths or colors of light equally, giving no changes in hue or coloration. Such filters can be purchased, for example, from Lee Filters. Light filters are categorized based on percent of light transmittance through the filter. Depending upon the brightness of the rear light source and the desired effect, a light filter with a transmittance of 75% to 3.125% is generally employed in the present invention. The transmittance can be 50% to 6.25%. However, filters with lower percent transmittance can be utilized, depending again upon the desired effect. With certain displays, it may be desirable to have a colored filter which filters more of a certain wavelength, thus providing a unique image. The light filter is positioned between the waveguide 12 and a second light source. The light filter may be attached or adhered to the rear surface of the waveguide 12.

As shown in FIG. 1A, behind the light filter is a transparency layer 20 which is simply a plastic film with an image 24 coated on the transparent film. The transparency 20 also includes a second light source 22 which, when illuminated, emits light that travels through the transparency 20, displaying the image 24 on the transparency through waveguide 12. As shown in FIG. 1A, a backlight 22 is employed, however an edge-lit illumination panel can also be used, such as, for example, Evonik's Endlighten product.

Translights are very well known, particularly in the television industry. Basically any translight can be used in the present invention.

In operation, the display as shown in FIG. 1A can display two images. As shown in FIG. 2A, the transparency 20 includes an image of a baseball 24. Thus, when the light source 22 is illuminated, shining light through the transparency 20, the image of baseball 24 would be seen. Basically any image can be incorporated on the transparency, such as, for example, a product, a message, any advertising and so on. In the first embodiment as shown in FIG. 2A, the image on the transparency is apparent through the front surface of the display when light 22 is illuminated.

Figure 2B:
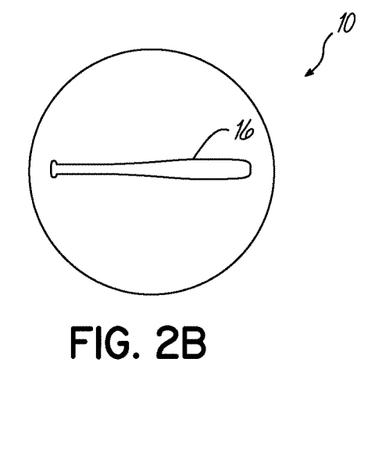
FIG. 2B is a plan view of the front surface of the display of FIG. 1A, showing a photoluminescent front image.

If the backlight source 22 is deactivated and the light source 14 on the waveguide 12 is activated, ultraviolet or low wavelength light will be transmitted through the waveguide 12, in effect energizing the photoluminescent material which forms image 16 on the front or back surface 15 of the waveguide 12, making image 16 visible. As shown in FIG. 2B, the image 16 is a baseball bat. However, again, the image can be in the form of virtually anything. Light filter 18 prevents the non-illuminated image 24 on transparency 20 from showing through waveguide 12. Therefore, only the bat and not the ball appears. Additional waveguides can be stacked on each other with different emissive images printed with a photoluminescent material and these can be selectively activated by separate additional light sources or activated simultaneously to provide whatever image is desired.

The brightness of the photoluminescent image may be from 20-500 candelas/$M^2$. The ratio of the brightness of the photoluminescent image to the brightness of the translight or rear image will be about 0.2 to about 5.

In this embodiment, the rear light 22 can be on whenever the waveguide 12 is not activated. This will provide the first desired image 24. If a customer approaches a display incorporating the present invention, a motion sensor connected to appropriate switches (not shown) can turn off the rear light 22 and turn on the light 14 associate with the waveguide 12, causing the image 16 of the baseball bat to be displayed, turning off the image of the baseball 24. The system can alternate the illumination sources 14 and 20 according to some programmed logic. Once the individual is far enough away from the display, and the sensor is no longer activated, the system can return to a steady state wherein light source 22 can illuminate image 24 and turn off the light source 14 which causes image 16 to appear. This, in effect, reduces the activation time of the emissive image 16 increasing the useful life of the photoluminescent inks forming image 16.

Figure 1B:
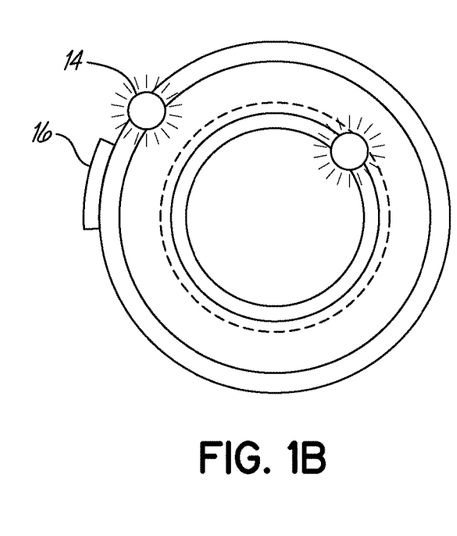
FIG. 1B is a diagrammatic cross-sectional view of a cylindrical display according to the present invention.

As shown in FIG. 1B, the display 10 can be any shape. As shown in FIG. 1B, display 10 is cylindrical. But it can take any shape, including cubical, spherical and so on.

Figure 3A:
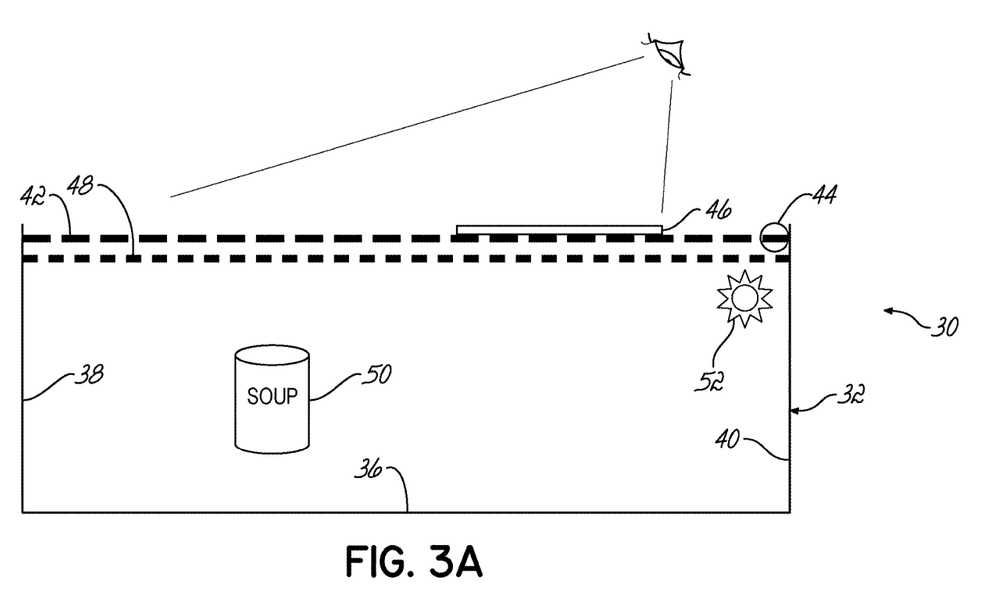
FIG. 3A is a diagrammatic cross-sectional view of an alternate embodiment of the present invention.

FIG. 3A shows an alternate embodiment of the present invention in which a display 30 includes a case 32 which includes a back wall 36, sidewalls 38 and 40, and top and bottom walls (not shown). A waveguide 42 forms the front surface of the display 30. As with the embodiment shown in FIG. 1, waveguide 42 includes a light source 44 and includes an image 46 formed on the surface of the waveguide.

Behind the waveguide 42 towards the back wall 36 of the case 32 is a light filter 48, which is the same light filter as light filter 18 in the embodiment shown in FIG. 1A. Behind the light filter 48 is a physical object 50. As shown in FIG. 3A, that physical object can be, for example, a can of soup. Again, the physical object can be anything that fits within the case 32. Also within the case is a second light source 52 designed, when illuminated, to shine on the physical object 50, making object 50 visible from the front surface of the display 30.

Figure 4A:
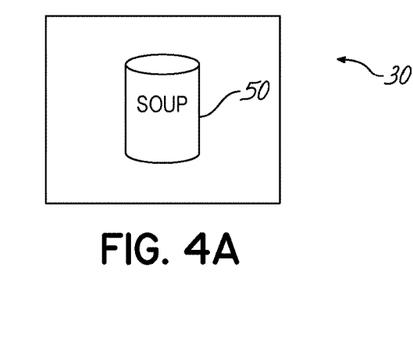
FIG. 4A is a plan view of the front surface of display FIG. 3A with a backlit illuminated physical object.
Figure 4B:
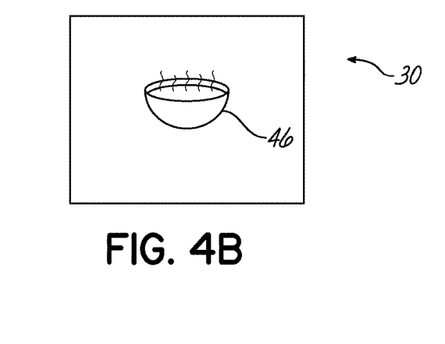
FIG. 4B is a plan view of the front surface of the display shown in FIG. 3A, with a photoluminescent image.

Again, just as with the embodiment shown in FIG. 1A, two different images can be shown. When the light source 44 is off and the light 52 is on, the physical object 50 would be seen from the exterior of the display 30. When the light 52 is turned off and the light 44 is turned on, the image 46 on the waveguide 42 will be visible, as shown in FIG. 4B, which shows a bowl of soup. Light filter 48 prevents the physical object 50 from being viewed when light source 52 is not illuminated. It also enhances the appearance of image 46 when light source 44 is illuminated by providing greater contrast. Again, these images are exemplary and virtually any image could be used.

Figure 3B:
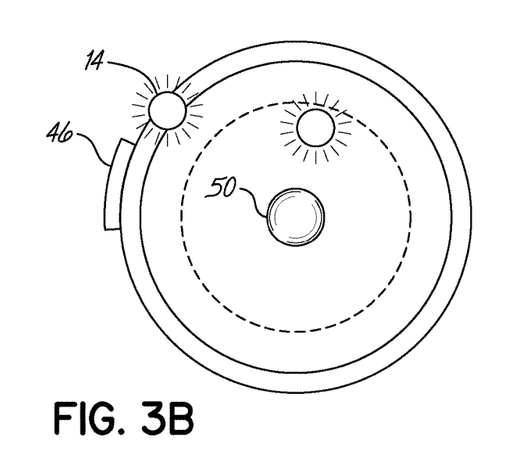
FIG. 3B is the same as FIG. 3A, but with a cylindrical case.

Likewise, the display can be any shape, such as cylindrical, as shown in FIG. 3B.

Further, as previously described, multiple waveguides can be stacked on each other to allow multiple images to be displayed concurrently or consecutively and, again, a motion sensor timer or other control can be used to activate and deactivate light sources as desired.

The present invention can also be used in a manner similar to that shown in FIG. 3A by positioning the waveguide and filter on, for example, the transparent surface of a refrigerated case. In this embodiment, case 32 would be a refrigerator case and object 50 would be the product located in the case 32. The light in the refrigerator case would illuminate the products in the case. When the waveguide 42 is activated, the image 46 on the waveguide 42 would be displayed while, at the same time, the light within the display case would be turned off or dimmed.

Figure 5:
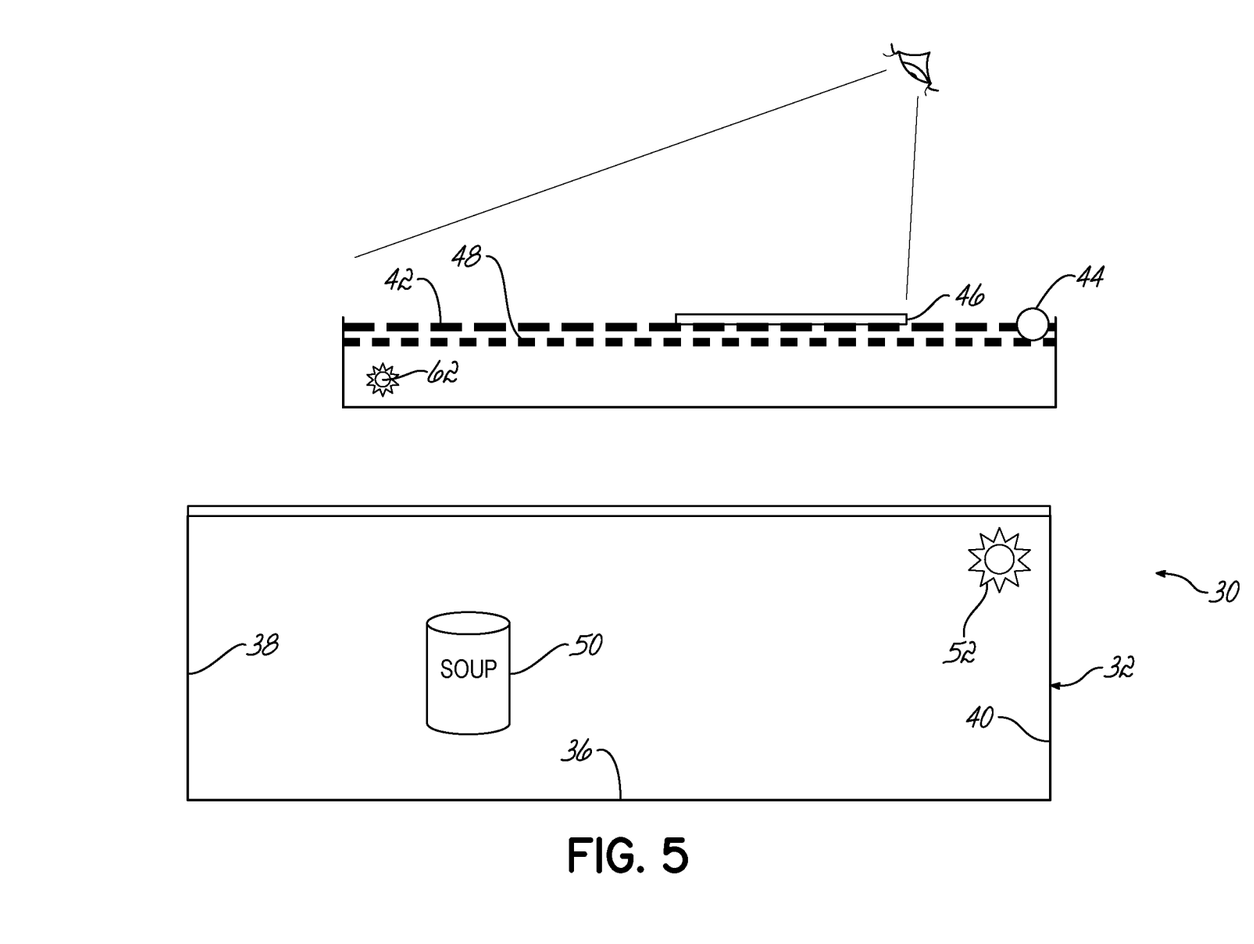
FIG. 5 is a cross-sectional view of an alternative embodiment of the present invention.

As shown in FIG. 5, in another embodiment of the present invention, waveguide 42 and filter 48 can be mounted as a separate system onto the transparent surface of case 32. For cases that incorporate continuously running interior lights that cannot be turned off when the photoluminescent layer 42 is illuminated, the transmittance of filter 48 can be decreased to provide a sufficiently dark background even though the object 50 is continuously illuminated by interior light 52. To compensate for this additional filtering, additional illumination sources (not shown) can be added between filter 48 and case 32 to illuminate object 50 when the photoluminescent layers are non-illuminated. This approach is applicable to any kind of case with a transparent surface and interior lights that run continuously.

Figure 6:
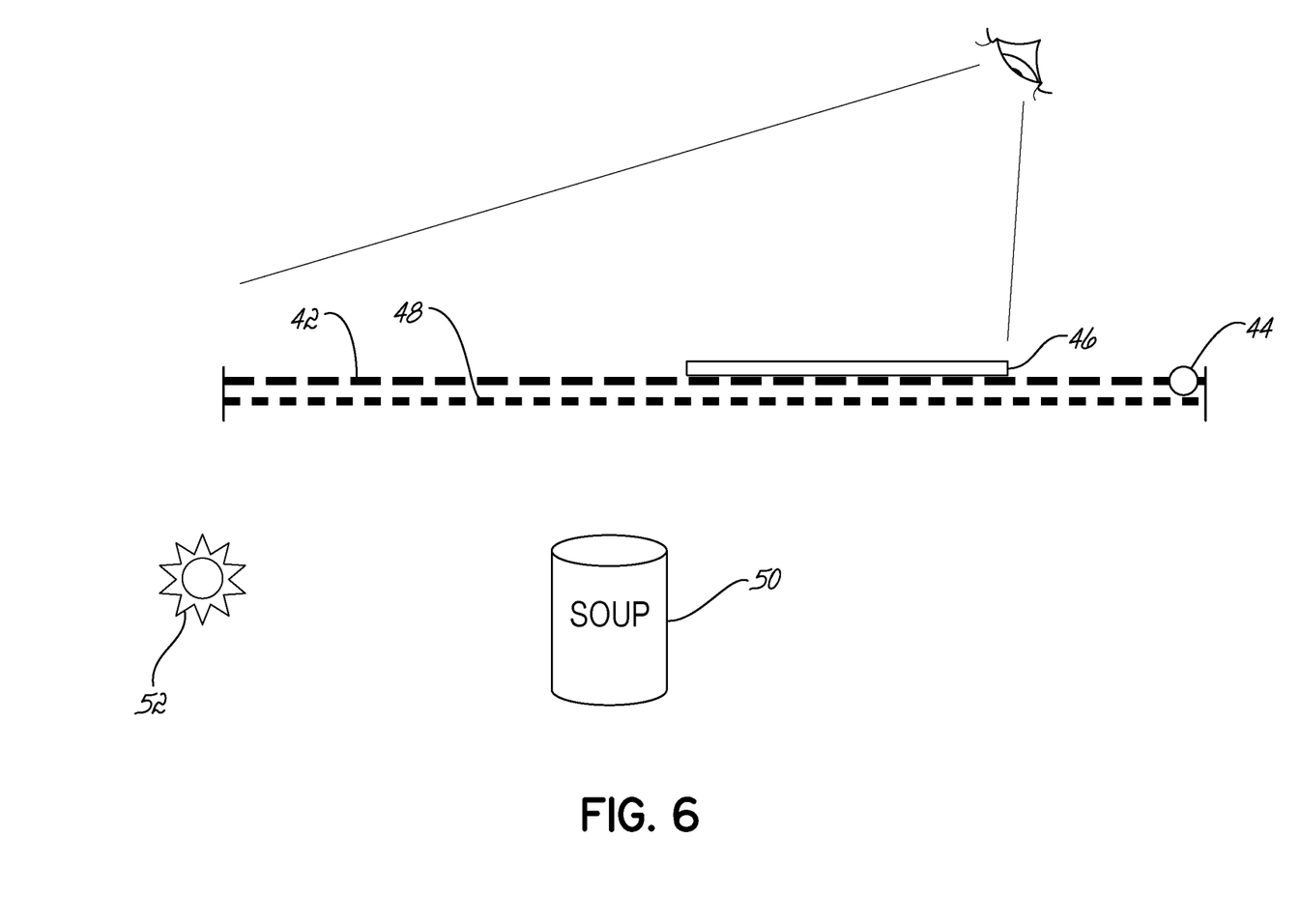
FIG. 6 is a cross-sectional view of a further embodiment of the present invention.

As shown in FIG. 6, the present invention can be a standalone display in which waveguide 12 with image 16 and filter 20 are positioned in front of object 50 and illuminated with an ambient light or a separate light source. Light source 14 can be activated to show or display image 16 and deactivated to show object 50.

Three specific examples of the present invention are set out below:

EXAMPLE #1

A display system was assembled using 3 Transitions® Digital Graphics, LLC photoluminescent semi-transparent printed panels stacked one on top of the other, each with its own dedicated LED strip (ultra-violet/violet) attached to the edge. Behind the photoluminescent layers, a printed transparency was placed. Behind the transparency was placed an Evonik Endlighten LED edge lit illumination panel with white LEDs on its edge. Between the transparency and the photoluminescent layers a Lee Neutral Density Filter #211 (ND 0.9) film was placed to darken the transparency and provide a sufficiently dark background when the transparency was not lit. Both a Duratrans® printed by Artisan Graphics and an inkjet transparency printed by SBPI Graphics were tested. Inks for the photoluminescent layers were provided by Sun Chemical. SBPI Graphics printed the photoluminescent layers.

When the photoluminescent layers were alternately energized while the transparency layer was non-illuminated, the background was sufficiently dark to provide contrast. When the transparency layer was illuminated, the illuminated image shown through the anterior photoluminescent layers with sufficient brightness to be effective.

EXAMPLE #2

2 photoluminescent layers were printed as in example #1 and 1 transparency layer was printed both using the Duratrans® and the SBPI Graphics inkjet process to serve as the back layer. Behind the transparency was placed an Evonik Endlighten LED edge lit illumination panel with white LEDs on its edge. Between the transparency and the photoluminescent layers, a Lee Neutral Density Filter #211 (ND 0.9) film was placed to darken the transparency and provide a sufficiently dark background when the transparency was not lit. Both a Duratrans® printed by Artisan Graphics and an inkjet transparency printed by SBPI Graphics were tested. Inks for the photoluminescent layers were provided by Sun Chemical. SBPI Graphics printed the photoluminescent layers.

When the photoluminescent layers were alternately energized while the transparency layer was non-illuminated, the background was sufficiently dark to provide viable contrast. When the transparency layer was illuminated, the illuminated image shown through the anterior photoluminescent layers with sufficient brightness to be effective.

EXAMPLE #3

A translight header from a Monster Energy cooler header was illuminated by back lighting with 1 white light LED strip. Measurements were taken of the brightness of the header in its factory delivered state. Several Lee Neutral Density Filters film layers were applied. ND 0.3, ND 0.6 and ND 0.2 filters were combined and studied to determine the required amount of filtering. Then 2 additional white light LEDs were added to the back light system such that looking through the filters, the transparency again provided similar luminance as previously measured at the factory delivered state. Then multiple Transitions® Effect photoluminescent panels were placed on top of the stack. Each panel was alternately illuminated. When the photoluminescent layers were energized, the background contrast provided by the filter film on top of the translight was sufficient that the photoluminescent images were effective. When the photoluminescent layers were non-energized and the translight was illuminated, it shown through the filter film and photoluminescent layers with sufficient brightness to be effective.

Thus, the present invention provides a display which has two or more different images, at least one of which being a photoluminescent emissive image from a waveguide and the second image being either an image on a transparency or a physical object which is viewable when a rear light source is activated or turned on and the light source for the waveguide is turned off. The light filter acts to prevent the image on the transparency or the physical object to be viewable when the rear light source is turned off and further provides a contrasting surface which makes the emissive This has been a description of the present invention along with preferred method of practicing the present invention, however, the invention itself should be defined only by the appended claims, wherein we claim:

1. A display comprising:
   a waveguide, said waveguide comprising a medium with a photoluminescent image which is at least one of printed, coated or mounted thereon;
   a first light source associated with said waveguide, said first light source adapted to transmit light at a wavelength less than 450 nm through said waveguide, causing said photoluminescent image to emit visible light;
   a second light source; and
   a light filter positioned between said waveguide and at least one of a medium and a physical object;
   wherein said second light source is adapted, when illuminated, to make visible a second image through said light filter of said display,
   wherein the second image is at least one of provided on the medium or provided by the physical object.

2. The display claimed in claim 1 comprising a transparency, said transparency including said second image, and
   wherein said second light source is adapted to transmit light through said transparency to display said second image.

3. The display claimed in claim 2 wherein said second light source is an edge light source.

4. The display claimed in claim 2 wherein said second light source is a back light source.

5. The display claimed in claim 2 wherein said waveguide and transparency are non-rectangular.

6. The display claimed in claim 2 wherein said waveguide and transparency are non-planar.

7. The display claimed in claim 1 wherein said second light source illuminates a three-dimensional object, providing said second image viewable through said waveguide.

8. The display claimed in claim 7 wherein said waveguide is non-rectilinear.

9. The display claimed in claim 1 further comprising a switch configured to automatically activate said first light source and to deactivate said second light source.

10. The display claimed in claim 9 wherein said switch is activated by a motion sensor to activate said first light source so as to cause said photo luminescent image to emit visible light.

11. The display claimed in claim 1 wherein said first image is formed from photoluminescent dyes having a transparency at least 50%.

12. The display claimed in claim 1 wherein said light filter has a transmittance of less than 75%.

13. The display claimed in claim 1 wherein said light filter has a transmittance of at least 3.125%.

14. The display claimed in claim 1 wherein said light filter is a film directly connected to said waveguide.

15. The display claimed in claim 1 further comprising at least one additional waveguide with an additional photoluminescent image,
   wherein each additional image is activated by a separate additional light source.

16. The display claimed in claim 1 wherein said display is a display enclosure having a transparent surface and said waveguide is affixed to said surface, and
   wherein said second light source is inside said enclosure.

17. The display claimed in claim 1 wherein said photoluminescent image includes one of a plurality of primary-color luminescent inks configured to create full color spectrum images corresponding to a minimum Maxwell triangle of (0.3, 0.4) (0.4, 0.3) (0.3, 0.3) as depicted on a 1931 CIE Chromaticity diagram.

18. The display claimed in claim 1 wherein said display is a display enclosure having a transparent surface and said waveguide is affixed to said surface, and
   wherein said second light source is outside said enclosure.

19. The display claimed in claim 1 wherein said light filter is adapted to reduce visibility of said second image through said display when said second light source is not illuminated.

20. The display claimed in claim 1 wherein the display has a display face providing a view of displayed images, and further comprising:
   a film on which the second image is provided,
   wherein the waveguide is positioned between the film and the display face, and
   wherein the light filter is configured to reduce visibility at the display face of the second image when said second light source is not illuminated.

21. The display as claimed in claim 1 wherein the first light source is configured to illuminate with light in the 380-420 nm range.

22. The display as claimed in claim 1 wherein the medium comprises a transparency, and the second light source is configured to illuminate the transparency with white light.

23. The display as claimed in claim 1 further comprising control electronics configured:
   to illuminate the second light source until a sensor is activated, and
   in response to the sensor being activated, to energize in an alternating pattern the first light source and the second light source.

24. A display having a display face providing a view of displayed images, the display comprising:
   a waveguide; and
   a photoluminescent image optically coupled to said waveguide;
   a first light source associated with said waveguide, said first light source adapted to transmit light through said waveguide, causing said photoluminescent image to emit visible light;
   a second light source adapted, when activated, to illuminate at least one of a medium and a physical object such that a second image is visible at the display face of the display,
   wherein the second image is at least one of provided on the medium or provided by the physical object;
   wherein the waveguide is positioned between the display face of the display and at least one of the medium or the physical object; and
   a light filter positioned between said waveguide and at least one of the medium or the physical object.

25. The display claimed in claim 24 wherein the first light source is configured to illuminate with light in the 380-420 nm range, and
   wherein the medium comprises a transparency, and the second light source is configured to illuminate the transparency with white light.

26. The display as claimed in claim 24 further comprising control electronics configured:
   to illuminate the second light source until a sensor is activated, and in response to the sensor being activated, to energize in an alternating pattern the first light source and the second light source.

27. The display claimed in claim 24 wherein said second light source is an edge light source, and
   wherein said second light source is a back light source.

28. The display claimed in claim 24 further comprising at least one additional waveguide with an additional photoluminescent image,
   wherein each additional image is illuminated by a separate additional light source.

29. A display case comprising:
   a case configured to display a physical object; and
   a display comprising:
   a waveguide including a medium with a photoluminescent image which is at least one of printed, coated and mounted thereon;
   a first light source associated with said waveguide, said first light source configured to transmit light through said waveguide, causing said photoluminescent image to emit visible light;
   a second light source; and
   a light filter positioned between said waveguide and at least one of a medium or a physical object;
   wherein said second light source is positioned and configured, when illuminated, to make visible a second image through said light filter of said display,
   wherein the second image is at least one of provided on the medium or provided by the physical object.

30. The display as claimed in claim 29 further comprising control electronics configured:
   to illuminate the second light source until a sensor is activated, or to turn off both the first light source and the second light source until the sensor is activated, and
   in response to the sensor being activated, to energize in an alternating pattern the first light source and the second light source.

* * * * *